United States Patent
Trandal et al.

(10) Patent No.: US 7,508,927 B1
(45) Date of Patent: *Mar. 24, 2009

(54) METHODS AND APPARATUS FOR RETURNING A CALL OVER A TELEPHONY SYSTEM

(75) Inventors: David S. Trandal, Santa Barbara, CA (US); David J Brahm, Santa Barbara, CA (US); Colin Kelley, Santa Barbara, CA (US)

(73) Assignee: CallWave, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/849,919

(22) Filed: Sep. 4, 2007

Related U.S. Application Data

(63) Continuation of application No. 10/818,090, filed on Apr. 5, 2004, now Pat. No. 7,266,185, which is a continuation of application No. 10/033,020, filed on Nov. 1, 2001, now Pat. No. 6,738,461.

(51) Int. Cl.
*H04M 1/56* (2006.01)

(52) U.S. Cl. .......................... 379/142.02; 379/142.01; 379/142.06; 379/210.01; 379/88.11; 379/88.19; 379/88.21; 379/207.15

(58) Field of Classification Search ............ 379/142.02, 379/142.01, 142.06, 210.01, 88.11, 88.19, 379/88.21, 207.15
See application file for complete search history.

(56) References Cited

U.S. PATENT DOCUMENTS

| | | | |
|---|---|---|---|
| 3,936,613 A | 2/1976 | Nishigori et al. | |
| 3,956,595 A | 5/1976 | Sobanski | |
| 4,009,337 A | 2/1977 | Sakai et al. | |
| 4,022,983 A | 5/1977 | Braun et al. | |
| 4,485,470 A | 11/1984 | Reali | |
| 4,736,405 A | 4/1988 | Akiyama | |
| 4,809,321 A | 2/1989 | Morganstein et al. | |

(Continued)

FOREIGN PATENT DOCUMENTS

EP  1 120 954  8/2001

(Continued)

OTHER PUBLICATIONS

Johnson, Dave; Article; "Now You're Talking-voice-response systems for home offices-Product Information"; http://www.findarticles.com; Feb. 1999.

*Primary Examiner*—Quynh H Nguyen
(74) *Attorney, Agent, or Firm*—Knobbe, Martens, Olson & Bear LLP

(57) ABSTRACT

The present invention provides a call-return process and system, wherein a called party can return a missed call to a caller's private number. A forwarded call is received by a call management system, wherein the forwarded call was originally directed by a caller to a first telephone line associated with a user. The call management system receives call signaling information, including a phone number, associated with the caller. The call management system then determines whether the phone number is a private phone number or a public phone number. If the phone number is private, the call management system notifies the user of the call, and without revealing the caller's phone number to the user, enables the user to return the caller's call.

20 Claims, 4 Drawing Sheets

U.S. PATENT DOCUMENTS

| | | | |
|---|---|---|---|
| 4,847,890 A * | 7/1989 | Solomon et al. | 379/88.21 |
| 4,893,336 A | 1/1990 | Wuthnow | |
| 4,994,926 A | 2/1991 | Gordon et al. | |
| 5,040,208 A | 8/1991 | Jolissaint | |
| 5,046,087 A | 9/1991 | Sakai | |
| 5,291,302 A | 3/1994 | Gordon et al. | |
| 5,404,537 A | 4/1995 | Olnowich et al. | |
| 5,434,908 A | 7/1995 | Klein | |
| 5,459,584 A | 10/1995 | Gordon et al. | |
| 5,467,388 A | 11/1995 | Redd, Jr. et al. | |
| 5,526,524 A | 6/1996 | Madduri | |
| 5,533,102 A | 7/1996 | Robinson et al. | |
| 5,577,111 A | 11/1996 | Iida et al. | |
| 5,583,918 A | 12/1996 | Nakagawa | |
| 5,619,557 A | 4/1997 | Van Berkum | |
| 5,640,677 A | 6/1997 | Karlsson | |
| 5,651,054 A | 7/1997 | Dunn et al. | |
| 5,668,861 A | 9/1997 | Watts | |
| 5,751,795 A | 5/1998 | Hassler et al. | |
| 5,774,067 A | 6/1998 | Olnowich et al. | |
| 5,805,587 A | 9/1998 | Norris et al. | |
| 5,809,128 A | 9/1998 | McMillin | |
| 5,812,551 A | 9/1998 | Tsukazoe et al. | |
| 5,825,867 A | 10/1998 | Epler et al. | |
| 5,832,060 A | 11/1998 | Corlett et al. | |
| 5,835,573 A | 11/1998 | Dee et al. | |
| 5,894,504 A | 4/1999 | Alfred et al. | |
| 5,920,623 A | 7/1999 | Bensman et al. | |
| 5,946,386 A | 8/1999 | Rogers et al. | |
| 5,960,064 A | 9/1999 | Foladare et al. | |
| 5,960,073 A | 9/1999 | Kikinis et al. | |
| 5,963,629 A | 10/1999 | Jung | |
| 5,995,594 A | 11/1999 | Shaffer et al. | |
| 5,995,603 A | 11/1999 | Anderson | |
| 6,014,436 A | 1/2000 | Florence et al. | |
| 6,031,896 A | 2/2000 | Gardell et al. | |
| 6,032,051 A | 2/2000 | Hall et al. | |
| 6,034,956 A | 3/2000 | Olnowich et al. | |
| 6,035,031 A | 3/2000 | Silverman | |
| 6,044,059 A | 3/2000 | Olnowich | |
| 6,078,581 A | 6/2000 | Shivelman et al. | |
| 6,104,800 A | 8/2000 | Benson | |
| 6,144,644 A | 11/2000 | Bajzath et al. | |
| 6,160,881 A | 12/2000 | Beyda et al. | |
| 6,167,127 A | 12/2000 | Smith et al. | |
| 6,169,795 B1 | 1/2001 | Dunn et al. | |
| 6,169,796 B1 | 1/2001 | Bauer et al. | |
| 6,178,183 B1 | 1/2001 | Buskirk, Jr. | |
| 6,181,691 B1 | 1/2001 | Markgraf et al. | |
| 6,208,638 B1 | 3/2001 | Rieley et al. | |
| 6,212,261 B1 | 4/2001 | Meubus et al. | |
| 6,230,009 B1 | 5/2001 | Holmes et al. | |
| 6,243,378 B1 | 6/2001 | Olnowich | |
| 6,253,249 B1 | 6/2001 | Belzile | |
| 6,266,400 B1 | 7/2001 | Castagna | |
| 6,278,704 B1 | 8/2001 | Creamer et al. | |
| 6,282,276 B1 | 8/2001 | Felger | |
| 6,304,565 B1 | 10/2001 | Ramamurthy | |
| 6,310,939 B1 | 10/2001 | Varney | |
| 6,330,317 B1 | 12/2001 | Garfinkel | |
| 6,340,274 B1 | 1/2002 | Shimomura et al. | |
| 6,345,090 B1 | 2/2002 | Walker et al. | |
| 6,350,066 B1 | 2/2002 | Bobo, II | |
| 6,353,660 B1 | 3/2002 | Burger et al. | |
| 6,353,663 B1 | 3/2002 | Stevens et al. | |
| 6,363,414 B1 | 3/2002 | Nicholls | |
| 6,405,035 B1 | 6/2002 | Singh | |
| 6,411,601 B1 | 6/2002 | Shaffer et al. | |
| 6,411,805 B1 | 6/2002 | Becker et al. | |
| 6,430,274 B1 | 8/2002 | Winstead et al. | |
| 6,438,216 B1 | 8/2002 | Aktas | |
| 6,438,222 B1 | 8/2002 | Burg | |
| 6,477,246 B1 | 11/2002 | Dolan et al. | |
| 6,496,569 B2 | 12/2002 | Pelletier et al. | |
| 6,496,576 B2 | 12/2002 | Tanaka et al. | |
| 6,501,750 B1 | 12/2002 | Shaffer et al. | |
| 6,505,163 B1 | 1/2003 | Zhang et al. | |
| 6,510,162 B1 | 1/2003 | Fijolek et al. | |
| 6,512,930 B2 | 1/2003 | Sandegren | |
| 6,519,258 B1 | 2/2003 | Tsukazoe et al. | |
| 6,546,087 B2 | 4/2003 | Shaffer et al. | |
| 6,549,612 B2 | 4/2003 | Gifford et al. | |
| 6,553,222 B1 | 4/2003 | Weiss | |
| 6,564,264 B1 | 5/2003 | Creswell et al. | |
| 6,564,321 B2 | 5/2003 | Bobo, II | |
| 6,567,505 B1 | 5/2003 | Omori et al. | |
| 6,574,319 B2 | 6/2003 | Latter et al. | |
| 6,621,892 B1 | 9/2003 | Banister | |
| 6,643,034 B1 | 11/2003 | Gordon et al. | |
| 6,662,232 B1 | 12/2003 | Nicholls et al. | |
| 6,687,362 B1 | 2/2004 | Lindquist et al. | |
| 6,690,785 B1 | 2/2004 | Stelter et al. | |
| 6,721,408 B1 | 4/2004 | Bain et al. | |
| 6,751,299 B1 | 6/2004 | Brown et al. | |
| 6,775,370 B2 | 8/2004 | Burg | |
| 6,782,088 B1 | 8/2004 | Gabara | |
| 6,785,021 B1 | 8/2004 | Gordon et al. | |
| 6,792,082 B1 | 9/2004 | Levine | |
| 6,792,094 B1 | 9/2004 | Kirkpatrick | |
| 6,857,074 B2 | 2/2005 | Bobo, II | |
| 6,898,275 B2 | 5/2005 | Dolan et al. | |
| 6,968,174 B1 | 11/2005 | Trandal et al. | |
| 7,003,087 B2 | 2/2006 | Spencer et al. | |
| 7,085,358 B2 * | 8/2006 | Ruckart | 379/88.19 |
| 2002/0110616 A1 | 1/2002 | Itzhaki | |
| 2002/0097710 A1 | 7/2002 | Burg | |
| 2002/0176558 A1 | 11/2002 | Tate | |
| 2003/0039339 A1 | 2/2003 | Luehrig et al. | |
| 2003/0063735 A1 * | 4/2003 | Brockenbrough et al. | 379/245 |
| 2003/0095650 A1 * | 5/2003 | Mize | 379/142.17 |
| 2004/0028203 A1 | 2/2004 | Wurster et al. | |
| 2004/0190706 A1 | 9/2004 | Fleischer et al. | |
| 2004/0258220 A1 | 12/2004 | Levine et al. | |
| 2005/0053216 A1 | 3/2005 | Spencer et al. | |
| 2005/0123118 A1 | 6/2005 | Terry et al. | |
| 2005/0207556 A1 | 9/2005 | Gonzalaz et al. | |
| 2006/0013374 A1 | 1/2006 | Fleischer, II et al. | |

FOREIGN PATENT DOCUMENTS

| | | |
|---|---|---|
| EP | 1 120 954 A2 | 8/2001 |
| JP | 10-513632 | 12/1998 |
| JP | 11-506292 | 6/1999 |
| JP | 2001-168989 | 6/2001 |
| WO | WO 96/18948 A1 | 6/1996 |
| WO | WO 97/26749 A1 | 7/1997 |
| WO | WO 98/36551 A1 | 8/1998 |
| WO | WO 0060840 | 10/2000 |
| WO | WO 01/76210 | 10/2001 |
| WO | WO 01/76210 A1 | 10/2001 |

* cited by examiner

METHODS AND APPARATUS FOR RETURNING A CALL OVER A TELEPHONY SYSTEM

PRIORITY CLAIM

This application is a continuation of U.S. patent application Ser. No. 10/818,090, filed Apr. 5, 2004, which issued as U.S. Pat. No. 7,266,185, which is a continuation of U.S. patent application Ser. No. 10/033,020, filed Nov. 1, 2001, which issued as U.S. Pat. No. 6,738,461, the contents of which are incorporated herein in their entirety.

BACKGROUND OF THE INVENTION

1. Field of the Invention

The present invention is related to methods and systems for telecommunications, and in particular, to methods and systems for processing calls.

2. Description of the Related Art

In today's public telephone network there is no convenient way to return a missed call to a private number. Typically, if the called party does not have the caller's phone number, the called party will not be able to return the call. To address this problem, there exist conventional telephony systems that do offer a convenient return call function to a public telephone number. These conventional telephony systems allow a user who misses a call to return the call by entering a predetermined touch tone code, such as *69, but do not offer this feature when the caller has a "private" number, that is, has caller-ID blocking turned on.

SUMMARY OF THE INVENTION

The present invention is related to methods and systems for a "return-call" process. In contrast to many conventional telephony systems, the return call process in accordance with the present invention enables a call to be returned to a "private" calling number that has caller-ID blocking. Further, the present invention allows the return process to be performed without revealing the return call phone number to the person returning the call.

This is in contrast to conventional telephony systems. By way of example, if a missed call on a busy, ring-no-answer, or do-not-disturb condition is answered by a Voice Mail or Internet Call Answering service, conventional telephony systems do not offer a way to return the call if it originated from a private number.

One example embodiment of the present invention will now be described in greater detail. While this example embodiment includes an Internet call answering apparatus and method, the present invention is not so limited. A call to a called party's phone line is forwarded to a call manager system, along with signaling information that includes the calling party's phone number The signaling can be performed using SS7 or other signaling methods that provide caller identification even if the caller has caller-ID blocking on. The call may be forwarded because the called party's phone line is busy, the called party failed to answer the phone, or because the called party has activated a do-not-disturb function.

The call manager system answers the forwarded call. A determination is made from the signaling information as to whether the caller's phone number is "private," that is, whether the calling party has Caller-ID blocking activated, or whether the phone number is "public," that is, does not have Caller-ID blocking activated.

The call manager system notifies the called party of the call. The notification can be presented on a web page accessed by the called party's computer terminal over the Internet or other computer network, can be emailed to the called party's email address, or can be transmitted to the called party's computer terminal over the Internet or other computer network upon detecting that the called party is online, whereupon the notification is displayed by a telecommunications client application executing on the computer terminal. If the phone number is public, then the notification informs the called party of the call and displays the calling number or otherwise identifies the caller.

If the call manager determines that the phone number is private, in order to protect the caller's privacy the caller's phone number is either not transmitted with the notification, or is transmitted but is not displayed to the called party. The telecommunications client application then offers to return the call using either the called party's conventional POTs telephone or via the computer terminal, if the computer terminal is VoIP enabled. The return call is then performed in accordance with the called party's selection. If the called party elects to have the call returned using the POTs telephone, then the computer modem dials the phone number provided in the call manager message, and the called party picks up the telephone handset to communicate with the original caller in a normal fashion. If the called party elects to have the call placed using VoIP, then the VoIP software transmits the phone number provided in the call manager message to a VoIP gateway which connects the call to the original caller. The called party can then communicate with the original caller using the computer terminal handset.

Alternatively, to further protect the caller's privacy when the phone number is private and might show up in the call detail in a phone bill, the return call is placed using a bridging operation performed by the call manager. Using this technique, the caller's telephone number does not need to be transmitted to the called party's computer terminal. Rather, the client application, web site, or notified device sends a return call request back to the call manager system identifying the call to bridge. The call manager system then calls the called party's (subscriber's) phone number and the caller's private phone number and bridges the two calls. Because the call was not placed from the called party's (subscriber's) residence, the caller's private telephone number will not be exposed in the subscriber's measured wireline, wireless, or long distance phone bill.

One embodiment of the present invention is a method of performing a return-call operation, comprising: receiving a forwarded call originally directed by a caller to a first telephone line associated with a user; receiving signaling information, including a phone number associated with the caller; determining whether the phone number is one of a private phone number and a public phone number; generating a display message, the display message notifying the user of the call, wherein the display message includes the phone number when the phone number is public, and the display message does not include the phone number when the phone number is private; and enabling the user to return the call to the caller without revealing the phone number to the user when the phone number is private.

Another embodiment of the present invention is a method of processing a call the method comprising: receiving a first call from a caller at a call management system, wherein the first call had been intended for a first telephone line associated with a called party and forwarded to the call management system; receiving at the call management system a private phone number associated with the caller; initiating the transmission of a message over a computer network to a computer terminal used by the called party, the message configured to provide a notification related to the call without displaying the private phone number; and enabling the called party to return the call to the caller.

Still another embodiment of the present invention is a method of performing a return-call operation, comprising: receiving a first plurality of forwarded calls originally directed by a corresponding plurality of callers to a first telephone line associated with a user; receiving signaling information for the plurality of callers, the signaling information including phone numbers corresponding to the callers; determining for each of the first plurality of phone numbers whether the phone number is one of a private phone number and a public phone number; generating a display message, the display message notifying the caller of the calls, wherein the display message includes for each of the first plurality of calls the corresponding phone number when the corresponding phone number is public, and the display message does not include the corresponding phone number when the corresponding phone number is private; receiving an instruction from the user to return one of the plurality of calls, wherein the one of the plurality of calls is associated with a first private phone number; and initiating the call return to the first private phone number at least partly in response to receiving the instruction.

Yet another embodiment of the present invention is a call processing apparatus, comprising: a first instruction configured to answer a first call from a caller, wherein the first call was directed to a first telephone line associated with a first user and was forwarded to a second telephone line; a second instruction configured to receive a private phone number associated with the caller; and a third instruction configured to transmit a message over a network to a computer terminal associated with the first user, the message configured to provide a notification of the first call without revealing the private phone number to the first user; and a fourth instruction configured to return the call to the caller without revealing the private phone number to the first user in response to a command from the first user.

Thus, the present invention provides systems and methods for a call-return system that enables an online user to be notified of a missed call and to initiate a return-call process using a computer terminal, even when the caller phone number is private.

BRIEF DESCRIPTION OF THE DRAWING

These features will now be described with reference to the drawings summarized below. These drawings and the associated description are provided to illustrate preferred embodiments of the invention, and not to limit the scope of the invention.

Throughout the drawings, like reference numbers are used to reference items that are identical or functionally similar.

DETAILED DESCRIPTION OF PREFERRED EMBODIMENTS

Figure 1:
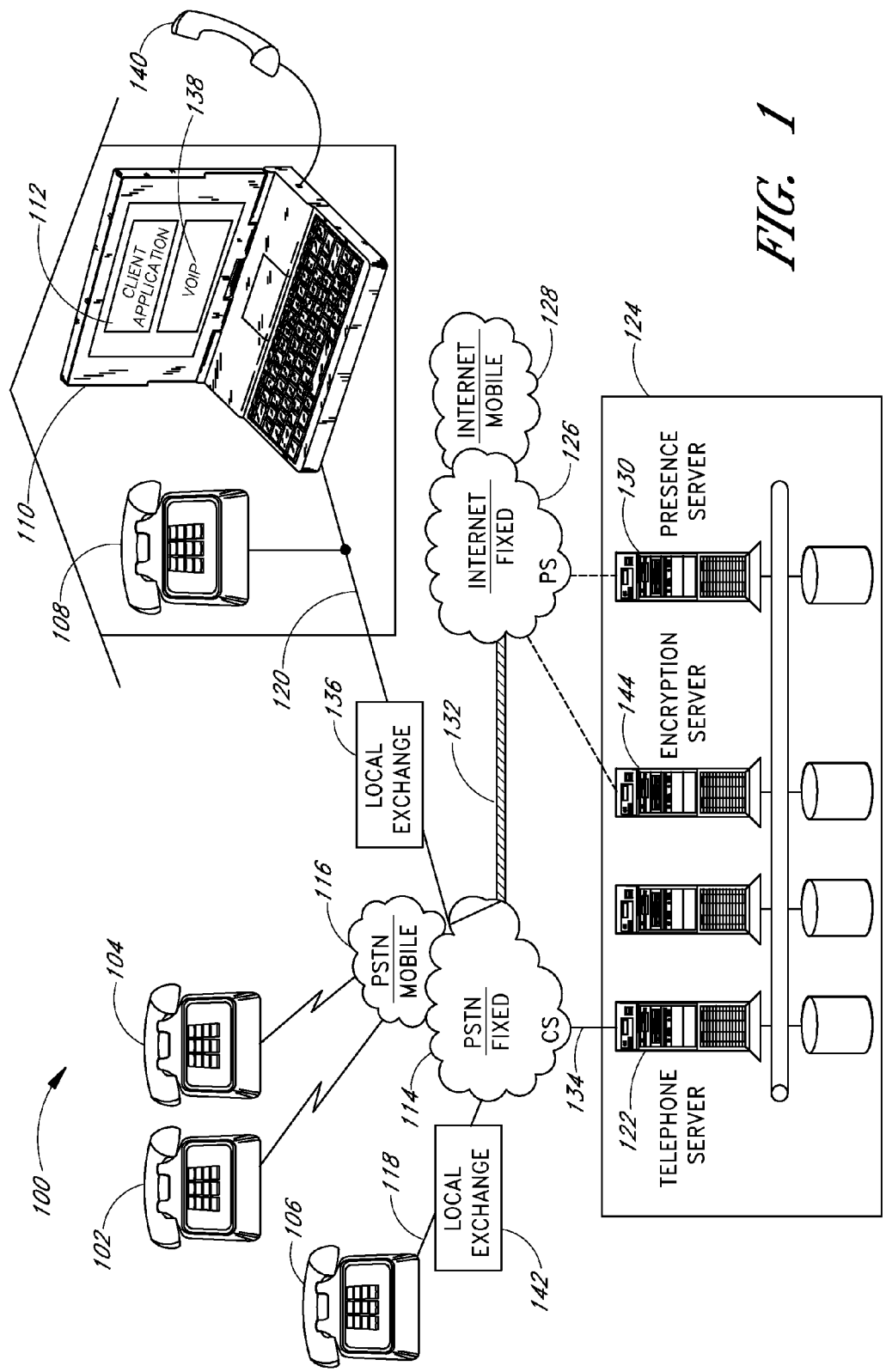
FIG. 1 illustrates an example telecommunications system in accordance with one embodiment of the present invention.

The present invention is related to methods and systems for a "return-call" process. In contrast to many conventional telephony systems, the return call process in accordance with the present invention enables a missed call to be returned to a "private" phone number without revealing the private number.

By way of example, a user may not be able to take an incoming call because the user's line is busy, the user is not home, or because the user does not want to be disturbed. To better manage such calls, the user's telephone line can be provisioned through the local phone company to forward incoming calls to a call manager system. The call manager system receives signaling information corresponding to the forwarded call. The signaling information includes the calling party's phone number even if the calling party's number is private.

The call manager system transmits a communication, including the caller phone number and a call-received notification, over a computer network to a computer terminal associated with the user. The notification is displayed on the user's computer terminal and informs the user that a call was received from the caller. If the caller phone number is public, the number is displayed as well. However, if the caller's phone number is private, the caller's number is not displayed to the user but is stored in the user's computer terminal memory for later use in returning the call. Upon receipt of the notification, the user can elect to return the call. In response to a user command, the computer terminal initiates the call using the stored caller phone number, still without displaying the phone number to the user.

Alternatively, rather than including the caller's private phone number in the communication to the user, the communication only includes a notification that a call was received. If the user elects to return the call, the call manager performs a call bridging operation without revealing the caller's private phone number to the user. This approach ensures that the user's phone bill will not include the caller's phone number. Further, because the phone number is not provided to the user, the user cannot improperly derive the caller's phone number from the call manager communication.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well. In addition, unless otherwise indicated, the functions described herein are preferably performed by executable code and instructions running on one or more general-purpose computers. In addition, a communications line is referred to as "busy" when the communication line is being utilized in such a way that a conventional incoming call will not be connected to the communications line. Thus, for example, if a user is utilizing a conventional line capable of only conducting one of a conventional voice session and a data session at a time for a data session, the line will be busy.

FIG. 1 illustrates an example telecommunications system 100 that can be used in accordance with the present invention. As illustrated, the telecommunications system 100 includes a plurality of user telephone stations. The telephone stations can be wired, such as stations 106, 108. However, the present invention is not limited to use with wireline phones. For example, the present invention can be used with wireless stations, such as stations 102, 104. The wired stations 106, 108 are connected via telephone lines 118, 120 to a PSTN 114 configured to process calls from fixed or standard telephone stations. The wired stations 106, 108 can be conventional POTS (Plain Old Telephone System) telephones.

The telephone lines 118, 120 may be shared with one or more computer terminals 110, facsimile machines or the like. The computer terminal 110 can be a personal computer having a monitor, keyboard, a disk drive, and a modem, such as a standard V.90 56K dial-up modem. The modem can optionally be configured to dial-up a number under control of an application, such as a contact manager application or telecommunications client application phone dialer, stored and executing on the computer terminal 110. In addition, the computer terminal 110 can be an interactive television, a networked-enabled personal digital assistant (PDA) or the like. Optionally residing and executing on the computer terminal 110 is a telecommunications client application 112. The telecommunications client application 112 is used to provide enhanced communication services, as discussed in greater detail below. The telecommunications client application 112 is connected to and communicates with a call manager system 124 via the Internet 126 or the like. The telephone lines 118, 120 can be used to establish a dial-up connection for computer terminals, such as terminal 110 via the modem, to an Internet Service Provider (ISP).

In addition, the computer terminal 110 can be equipped with VoIP (Voice over Internet Protocol) software 138 and a handset 140, including a microphone and speaker, allowing voice communications to be conducted over the Internet 126 using Internet Protocol. VoIP communicates data via packet switching, which opens a connection just long enough to send a packet of data, including digitized voice data. In particular, the computer terminal 110 divides the voice data into small packets. Each packet includes a destination address informing the network where to send the packet. If the receiving station is also a VoIP terminal, then when the receiving terminal receives the packets, VoIP software executing on the receiving terminal reassembles the packets into the original data stream. The data stream is then converted to a voice signal. If the receiving station is a conventional telephone, then a VoIP gateway converts the packets into a voice signal which is then connected to the conventional telephone.

In one embodiment, the VoIP process is performed using the H.323 standardized protocol established by the International Telecommunications Union (ITU). Advantageously, H.323 provides specifications for real-time, interactive videoconferencing, data sharing and audio applications such as IP telephony. Alternatively, the Session Initiation Protocol (SIP), established by the Internet Engineering Task Force (IETF), can be used. SIP is generally more efficient than the H.323 protocol as SIP is specifically intended for IP telephony.

In particular, the telephone stations 106, 108 and/or computer terminal 110 are coupled via the fixed PSTN 114 to corresponding local exchange switches 136, 142, used to connect and route calls, and to and from local exchange switches and remote exchanges via tandem switching offices (the fixed PSTN). The telephone stations are connected to a telephone server system 122 in the call manager system 124, coupled to the fixed PSTN 114 through a trunk system 134. Thus, advantageously the call manager system 124 does not have to be coupled to the same local exchange as the calling or called terminal. Indeed, the call manager system 124 can be located in a different country than the called and calling parties and does not have to be positioned between the local exchange switch and the calling station.

Figure 4:
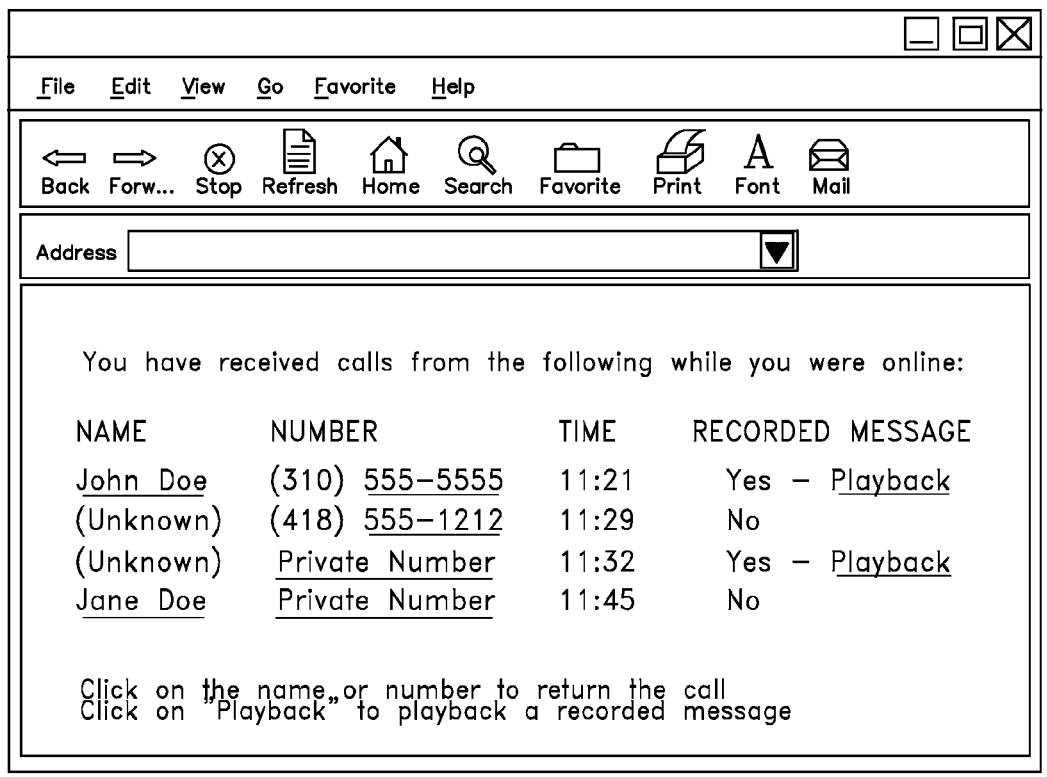
FIG. 4 illustrates an example return-call notification.

The call manager system 124 optionally hosts a Web site used by subscribers of the call manager system 124 to setup and manage their accounts and to view a return call web page, such as that illustrated in FIG. 4. Other embodiments of the call manager system 122 are described in U.S. patent application Ser. No. 09/539,375, filed Mar. 31, 2000, the contents of which are incorporated herein in their entirety by reference. The call manager system 122 is optionally configured as, or to appear as, a telephone central office and can interface with the PSTNs 114, 116 as a Class 5 switch.

The telephone trunk system 134 has associated signaling channels. The present invention is not limited to a particular signaling convention. For example, as illustrated, the present invention can be utilized with a Common Channel Signaling system, such as Signaling System 7 (SS7), having separate voice/user data and signaling channels. In addition, the present invention can be used with other signaling methods, such as ISDN, Advanced Intelligent Network (AIN), and/or inband signaling. The selected signaling system provides caller identification, wherein the caller's telephone number is provided to the called party. Thus, for example, ANI (Automatic Number Identification) information is provided, wherein the caller's local telephone company transmits the calling or billing telephone number along with the call.

The wireless stations 102, 104 are coupled to a PSTN 116, configured to handle mobile, wireless stations via wireless communications towers configured to broadcast and receive cellular radio frequency communications. The wireless towers can be, for example, CDMA or GSM cellular mobile base stations. The PSTN 116, in turn, is connected to the call manager system 124 via the trunk system 134. The call manager system 124 can communicate via the Internet mobile 128 with other Internet capable devices, including wireless stations 102, 104, configured to receive Internet communications, including, but not limited to, text messages.

When a user attempts to place a call via station 102 to station 108, the call is routed through a mobile base station system to the PSTNs 114, 116. If the line 120 for station 108 is busy, not answered or has a do-not-disturb indication, the PSTN 114 forwards the call to a local or toll-free number associated with the call manager system 124. The call manager 124 then processes the call as described in greater detail below.

The call manager system 124 manages communications with the telecommunications client application 112 and with forwarded calls. The call manager can interact with callers and called parties through voice prompts, voice commands, and dtmf touch-tone entries. The call manager system 124 can be configured to perform additional functions, such as acting as a telephone answering system that answers call, plays outgoing messages, records incoming messages, and bridges calls.

One such Internet answering system is operated by CallWave, Inc. As is well known in the field of Internet telecommunications, CallWave, Inc. provides an Internet answering service that works with the "Call Forward On Busy" feature of a standard phone line to answer calls while the subscriber is online and is using the phone line to access the Internet. Once activated, callers no longer get annoying busy signals when the subscriber is online. Instead, callers hear a brief greeting after which they can leave a short message. The recording can be streamed in substantially real-time or sent within seconds after recording has completed to the subscriber over the Internet.

The call manager system 124 is connected to the Internet 126, 128 as a computer host. As previously discussed, the call manager system 124 can also host a Web site used to manage subscriber accounts and to provide a call return interface. When a user or subscriber connects to the Internet using, for example, a dial-up ISP, the telecommunications client application 112 executing on the subscriber's computer terminal can make the subscriber's online presence known to the call manager system 124. In particular, the call manager system 124 includes a presence detection system 130 that communicates with the telecommunications client application 112 executing on the computer terminal 110 to determine whether the computer 110 is online. Presence detection can be performed by the presence detection system 130 polling or pinging the computer terminal 110 via the telecommunications client application 112, or by the telecommunications client application transmitting an "I'm alive" message and subsequent periodic "keep alive" messages to the presence detection system 130. The client application 112 is optional, and is not needed in some embodiments. The call manager system 124 further includes an encryption server 144, which is described in greater detail below.

A user can access a data network, such as the Internet 126, by establishing a telephone dial-up connection to an ISP. The Internet 126 is coupled to the PSTNs 114, 116, via a trunk or backbone system 132. Text, graphic and voice communications can be communicated between the call manager system 122 and the computer terminal 110. For example, communications are transmitted from the call manager system 122 over the PSTN 114, via the trunk system 132 to the computer terminal 110 via the Internet 126. Similarly, communications are transmitted from the computer terminal 110, over the Internet 126, through trunk system 132 to the to the telephone and presence servers 122, 130. The user is preferably a registered subscriber to the call manager system 124.

Figure 2:
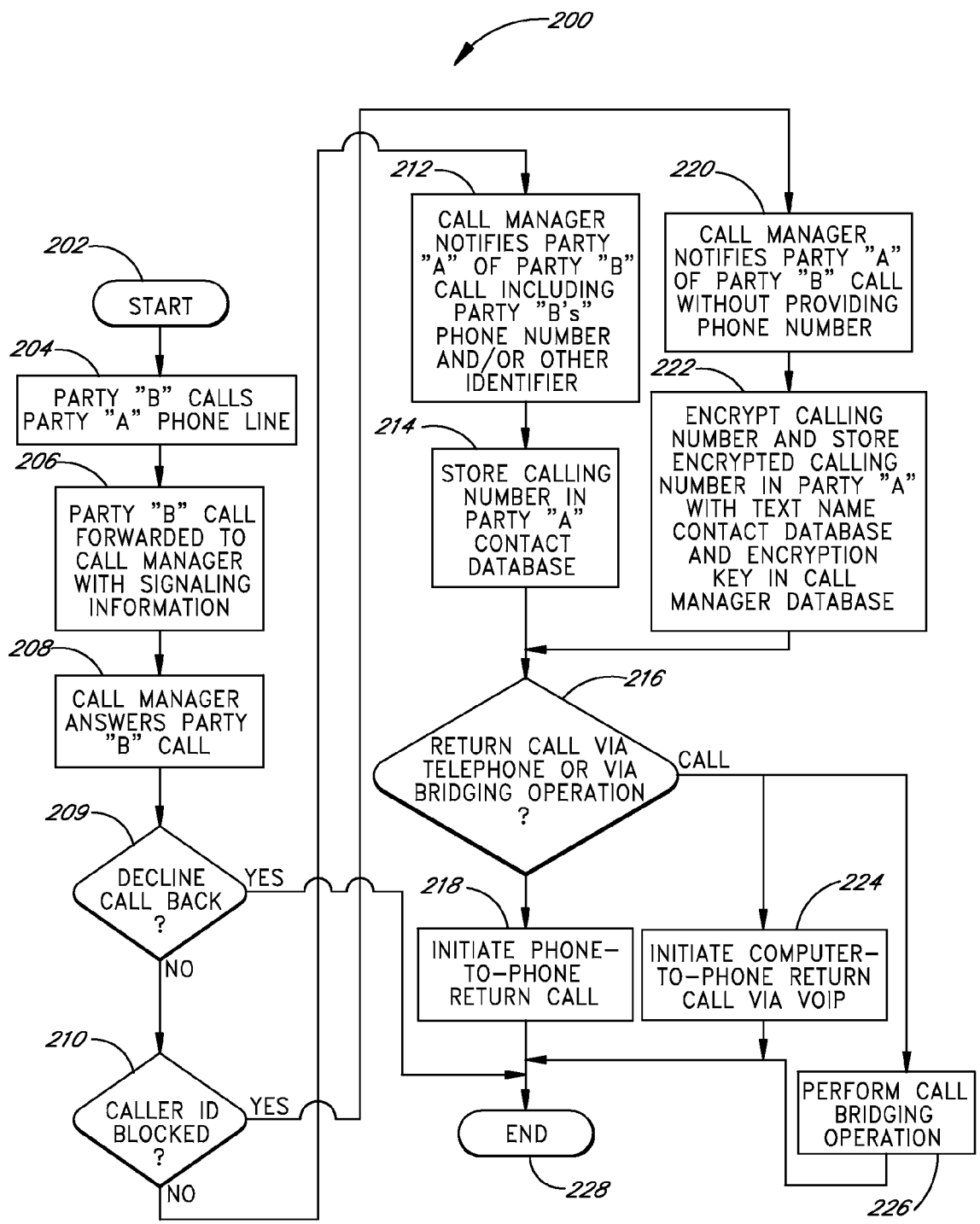
FIG. 2 illustrates an example return-call process in accordance with the present invention.

The example telecommunications system illustrated in FIG. 1 can be used with one embodiment of the return-call process in accordance with the present invention. FIG. 2 illustrates an example return-call process 200, wherein a called party, referred to as Party A, misses a call from a calling party, referred to as Party B, and then returns Party B's call. It is assumed for the purposes of this example that the called party's line is provisioned with "Call Forward On Busy," call forward on "Ring-No-Answer", and/or call forward when the user has activated a "do-not-disturb" feature.

Beginning at start state 202, the process 200 proceeds to state 204. At state 204, Party B calls Party A's phone line using, by way of example, the wired station 106 illustrated in FIG. 1. At state 210, Party B's call is forwarded to the call manager system 124 over the PSTN, such as PSTN 114, along with signaling information. The signaling information includes Party B's phone number via ANI (Automatic Number Identification). Because Party B's call is being forwarded to the call manager system, the call manager system infers that Party 's line is busy or that Party A is otherwise not available to take the call. Further, because the call manager is configured as a central telephone office and receives SS7 signaling information, even if Party B has caller-ID blocking on, so that Party B's telephone number is designated as "private," the call manager receives Party B's telephone number. The "private" designation is provided by a presentation indicator associated with each call that designates the calling party as private or public.

In one embodiment, Party A's line is configured so that calls are forwarded over the PSTN to either a local telephone number or a toll-free number associated with the call manager system when Party A's line is busy. The toll-free number may be an "800" or "888" number, by way of example. Because Party B's call is being forwarded to a toll-free number, even if Party B has caller-ID blocking on, and even if the call manager system is not configured as a central office, the calling number is transmitted to the call manager system.

At state 208, the call manager system answers Party B's call. Party B is provided the option of recording a voice message on the call manager system for delivery to Party A. At state 209, the call manager can also ask the Party B if Party A is to be notified of the call so that Party A can return the call. In this embodiment, if the caller declines, then no return call notification is provided to Party A, and the process 200 ends. If Party B does want a return call notification provided to Party A, the process 200 proceeds to state 210.

A determination is made at state 210 as to whether Party B's number is "private," with Caller-ID blocking activated. If Party B's number is not "private," it is designated as "public." If Party B's number is public, then at state 212 the call manager transmits a message to Party A's computer terminal notifying Party A that Party B has attempted to call Party A, the message including Party B's phone number. In one embodiment, a telecommunications client application executing on Party A's computer terminal displays the message, including Party B's phone number, on the computer terminal's monitor. Optionally, the call manager waits to receive a presence indication, in the form of a log-on or a "keep alive" communication from the client application before transmitting the message. Alternatively or in addition, Party A can access a "missed calls" page, such as that illustrated in FIG. 4, from a web site operated in association with the call manager. Further, the call manager can email the message to Party A.

Optionally, the call manager can access a reverse number database or a contact database associated with Party A to locate a name or other identifier associated with Party B's phone number. If a corresponding name or other identifier is located, it can be included for display in the message provided to Party A. The contact database can be stored on Party A's terminal or the call manager system.

In addition, if Party B recorded a voice message, that message can be transmitted or streamed to Party A's computer terminal for playback in substantially real-time. At state 214, the telecommunications client application or call manager system inspects Party A's contact database to determine if a record exists for Party B's number. If not, the telecommunications client application or call manager offers to create a contact record for Party B. If Party A agrees to have a contact record created for Party B, the telecommunications client application or call manager automatically populates the contact record with Party B's phone number, and if available, name, and enables Party A to edit or add information to the record. Party A can then instruct that the contact record be saved and closed. Party A can later place calls to Party B using the stored contract information.

If Party B's number is "private," the process 200 proceeds from state 210 to state 220. As discussed above, even if Caller-ID blocking is on, the call manager system still receives Party B's phone number. However, in order to protect the caller's privacy and if needed to comply with federal or other regulations, the call manager system notifies Party A that a call was received, but does not provide for display Party B's phone number unless authorized by the calling party in response to a request from the call manager system. The authorization can be provided through one or more voice prompt interactions. However, if Party B recorded a voice message, the call manager system transmits the voice message to Party A's computer for playback by Party A.

Proceeding to state 222, the telecommunications client application or call manager system inspects Party A's contact database to determine if a record exists for Party B's number. If not, the telecommunications client application or call manager system offers to create a contact record for Party B. If Party A agrees to have a contact record created for Party B, the telecommunications client application or the call manager encryption server 144 illustrated in FIG. 1, automatically encrypts the caller's number with an encryption key so that Party A cannot read the number, and populates the record with Party B's encrypted phone number, and other available, non-private information. The encryption key is stored on a call manager encryption server so that the encrypted number can be later decrypted. Party A can edit or add information to the record. For example, Party A can tag the encrypted number with a text identifier, such as the caller's name, to help Party A be able to later locate and call Party B using the contact database record. Party A can then instruct that the contact record be saved and closed. Party A can later place calls to Party B using the stored contact information.

Alternatively, the private phone number can be stored on the call manager system server and an index or pointer to the phone number is stored on Party A's computer system. When Party A wants to later call Party B, Party A initiates the transfer of the index to the call manager, which then transfers the phone number to Party A's telecommunications client application. The telecommunications client application then initiates a call to Party B without displaying the phone number to Party A. A calling process using the encrypted phone number is described below with reference to FIG. 3.

Proceeding to state 216, Party A can be offered a choice of returning Party B's call using Party A's conventional POTs telephone, via Party A's VoIP-enabled terminal, or by a call bridging operation performed by the call manager. In one example method, if Party B's number is designated as private, Party A may be limited to returning Party B's call by the call bridging operation.

If Party A elects to have the call placed using a conventional telephone, then the process proceeds to state 218, where a call is initiated over Party A's telephone. In particular, the computer modem dials the phone number provided in the call manager message, and the Party A picks up the telephone handset to talk with Party B when Party B answers.

If Party A elects to have the call placed using VoIP, then the process proceeds to state 224, where a call is initiated by Party A's computer terminal. The VoIP software transmits the phone number provided in the call manager message to a VoIP gateway that converts the call data from packets into a form suitable for telephonic communications with the caller's phone, and connects the call via the PSTN to the original caller. The called party can then communicate with the original caller using the computer terminal handset. Using VoIP to return the call avoids having Party B's phone number appear on Party A's phone bill.

If Party A elects to have the call placed using a bridging operation, then the process proceeds to state 226, where a call is bridged between Party A and Party B by the call manager. A notification is sent from Party A's client application, call manager web-site, or other notification device of Party A's desire to return a call to Party B. Included in Party A's request is a unique identifier, such as a database pointer or index, that allows the call manager system to determine Party B's phone number from a database of stored/encrypted numbers. The call manager system first calls Party A's phone number which is specified in Party A's request. The call can be placed, by way of example, as a POTs or VoIP call. Next, the call manager system calls Party B's line and bridges Party A with Party B. Alternatively, the call manager system first calls Party B's phone number, then the call manager system calls Party A's line and bridges Party A with Party B. Other bridging techniques which are well known to those of ordinary skill in the industry, and hence not explained in detail herein, can be used as well. The process ends at state 232. Alternatively, rather than asking Party A to select whether the call is to be placed using the telephone or using VoIP, the telecommunications client application detects if Party A is online. If so, the call is automatically placed using VoIP. If Party A is offline, the call is automatically placed via the telephone, with the computer modem performing the dial-up operation.

If multiple calls to Party A are forwarded to the call manager system, a log is kept of each call. By way of example, the log includes each caller's phone number, the time of the call, and whether the caller recorded a message. This information is then used to generate a missed/return-call notification for Party A, as discussed in greater detail below with respect to FIG. 4.

Figure 3:
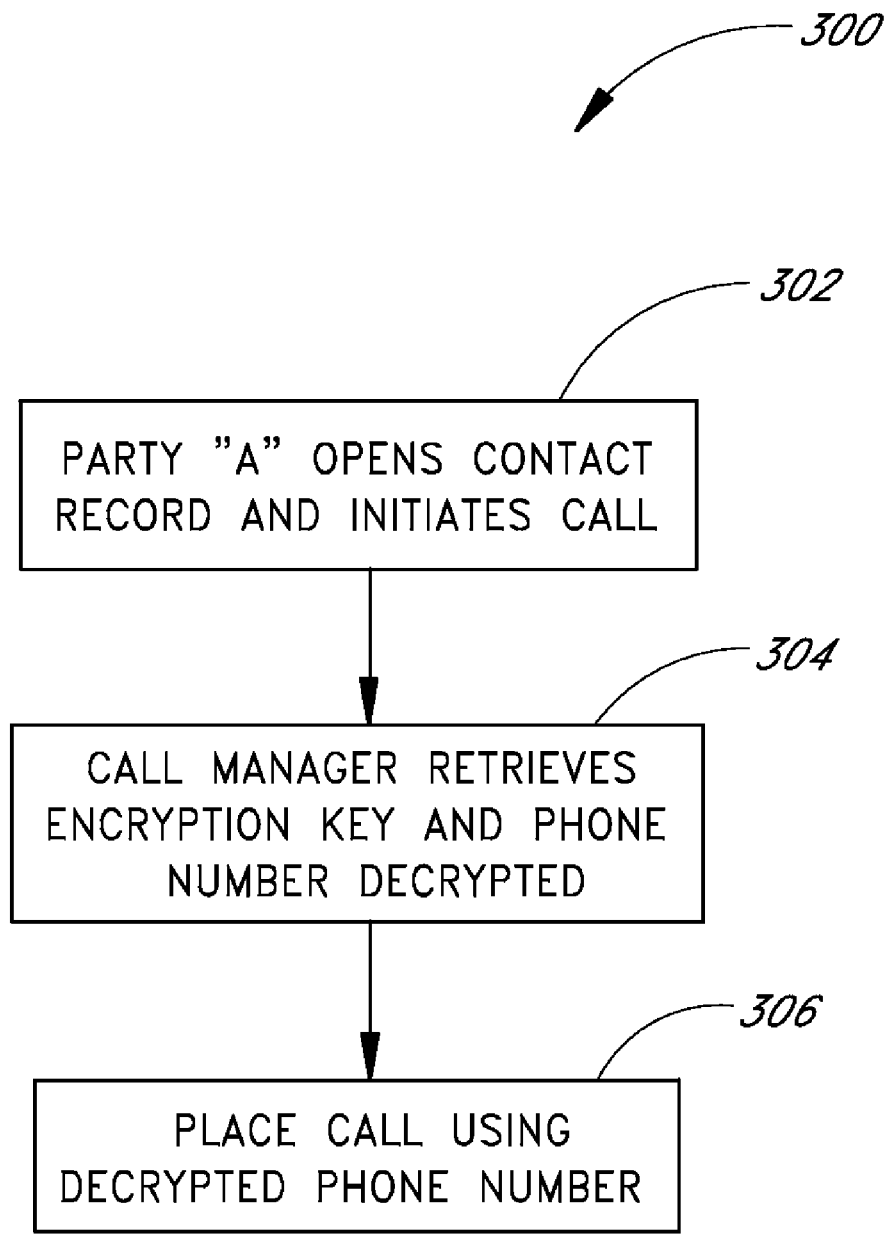
FIG. 3 illustrates an example process for returning a call using an encrypted phone number.

FIG. 3 illustrates an example process 300 for calling a called party whose phone number is stored on the calling party's computer terminal in an encrypted format and hence unknown to the calling party. Beginning at state 302, when Party A wants to place a call to Party B, Party A opens the contact record stored on Party A's computer system, and instructs that a call be placed to Party B. At state 304, the telecommunications client application retrieves the corresponding encryption key from the call manager system and decrypts the phone number. Alternatively, the call manager retrieves the encrypted phone number from the computer system, decrypts the phone number using the encryption key, and transmits the decrypted phone number back to the computer system. At state 306 the call is placed using the decrypted phone number, but without revealing the encrypted phone number to Party A.

In another embodiment, rather than storing Party B's phone number on Party A's computer terminal, the phone number is instead stored on the call manager system and a pointer to the phone number is stored on Party A's computer terminal. When Party A wants to call Party B, the client application passes the number to the call manager system, which then performs a call bridging operation between Party A and Party B. This ensures that Party B's phone will not be displayed on Party A's phone bill.

FIG. 4 illustrates an example missed/return-call notification presented via a browser to a called party. The browser can be executing on a computer terminal, such as a Wireless Application Protocol (WAP)-enabled phone, a PDA or the like. The notification can be accessed by supplying the appropriate URL to the browser and optionally providing log-on information, such as a user name and a password. In addition or alternatively, the missed/return-call notification can also be transmitted to the telecommunications client application discussed above for display on the computer terminal.

The notification lists missed calls, including the caller identity when known, the caller's phone number, when public, the time of the call, and whether the caller left a message. If caller's phone number is "private," then as discussed above, the phone number is not displayed to the called party. Instead, the phrase "Private Number" or the like is displayed. If a contact record has been previously stored in the called party's database, as previously discussed with respect to FIG. 2, then a text message entered in association with the encrypted private number is displayed. In the example illustrated in FIG. 4, the name "Jane Doe" is a text message previously stored by the called party in association with the encrypted private number.

When a called party clicks on the caller's name, phone number, or the phrase "Private Number," a return call is initiated by the called party's computer system as described above with reference to FIGS. 2 and 3. If the called party clicks on or otherwise activates the "playback" link, the message left by the caller will be played back by the computer system to the called party. Alternatively, the messages can be played back by the called party's terminal in substantially real-time as the messages are being recorded so long as the messages do not overlap in time.

Thus, as described above, the present invention provides systems and methods for a call-return system that enables an online user to be notified of a missed call and to initiate a return-call process using a computer terminal, even when the caller phone number is private.

Although this invention has been described in terms of certain preferred embodiments, other embodiments that are apparent to those of ordinary skill in the art are also within the scope of this invention.

What is claimed is:

1. A method of performing a call operation for a call associated with a caller private phone number, the method comprising:
   receiving, at a call processing system, from a caller a call intended for a user;
   receiving, at the call processing system, signaling information, including a private phone number associated with the caller;
   storing the private phone number in encrypted form in computer readable memory, wherein the user is prevented from viewing the private phone number;
   notifying the user of the call, via the call processing system, wherein the notification does not include the private phone number;
   enabling the user to call the private phone number without revealing the private phone number to the user, via an interface accessible via at least one user terminal,
   wherein the caller's private phone number does not appear on a telephone bill of the user as a result of the call to the caller's private phone number;
   receiving at the call processing system a caller identifier for the caller provided by the user;
   causing, at least in part, the caller identifier to be stored in computer readable memory with an association with the private caller phone number without revealing the private caller phone number to the user; and
   at least partly in response to a second call from the caller, providing via at least one terminal the user with a notification of the second call without revealing the private caller phone number to the user, the second call notification including the user provided caller identifier.

2. The method as defined in claim 1, the method further comprising:
   receiving a caller identifier for the caller provided by the user;
   causing, at least in part, the caller identifier to be stored with an association with the private caller phone number without revealing the private caller phone number to the user;
   at least partly in response to a second call from the caller, providing the user with a notification of the second call without revealing the private caller phone number to the user, the second call notification including the user provided caller identifier.

3. The method as defined in claim 2, wherein the user provided call identifier is stored in a database remote from the user.

4. The method as defined in claim 2, wherein the user provided call identifier is stored on a terminal associated with the user.

5. The method as defined in claim 1, the method further comprising:
   placing an outcall to the caller via the call processing system; and
   connecting the outcall to the caller with a call between the user and the call processing system.

6. The method as defined in claim 1, further comprising:
   enabling, via the call Processing system, the caller to record a voice message during the call; and
   providing the user with access to the voice message via a computer terminal.

7. The method as defined in claim 1, wherein the user is offered a plurality of communication technique choices for calling the caller via a user interface presented on a user terminal.

8. The method as defined in claim 1, the method further comprising enabling the user to select from a plurality of terminals that is to be used to call the caller, the plurality of terminals including a VoIP communications device.

9. The method as defined in claim 1, the method further comprising enabling, via program code executable by a computer system, the creation of a contact record for the caller without providing the private caller phone number to the user, wherein the contact record can be used by the user to call the caller.

10. A method of performing a call operation with respect to a private phone number, the method comprising:
    receiving signaling information, at a call processing system, for a call from a caller intended for a user, the signaling information including a private phone number associated with the caller;
    storing the private phone number in computer readable memory using encryption;
    recording a voice message from the caller via a recording system;
    automatically notifying the user of the call via the call processing system, wherein the notification does not include the private phone number, wherein the notification is transmitted to a personal computer, a personal digital assistant, and/or an interactive television associated with the user;
    enabling, via at least one user interface accessible via at least one terminal, the user to access the voice message from a terminal;
    enabling, via at least one user interface accessible via at least one terminal, the user to place a call to the private phone number without revealing the private phone number to the user; and
    storing the private phone number in computer readable memory, wherein the user is prevented from viewing the private phone number, and the caller's private phone number does not appear on a telephone bill of the user as a result of the call placed to the private phone number;
    receiving at the call processing system a caller identifier for the caller provided by the user;
    causing, at least in part, the caller identifier to be stored in computer readable memory with an association with the private caller phone number without revealing the private caller phone number to the user; and
    at least partly in response to a second call from the caller, providing via at least one terminal the user with a notification of the second call without revealing the private caller phone number to the user, the second call notification including the user provided caller identifier.

11. The method as defined in claim 10, wherein the call placed to the private phone number is performed using Voice over Internet Protocol.

12. The method as defined in claim 10, wherein the call placed to the private phone number is performed by the call processing system calling the user, calling the caller, and connecting the calls to the user and the caller.

13. The method as defined in claim 10, wherein the call placed to the private phone number is performed by the call processing system first calling the user, then calling the caller, and connecting the calls to the user and the caller.

14. The method as defined in claim 10, wherein the call placed to the private phone number is performed by the call processing system first calling the caller, then calling the user, and connecting the calls to the user and the caller.

15. The method as defined in claim 10, wherein the call to the private phone number is performed by placing an outcall to the caller via the call processing system, and
    connecting the outcall to the caller with a call between the user and the call processing system.

16. The method as defined in claim 10, wherein the notification is transmitted to a personal computer, a personal digital assistant, and/or an interactive television associated with the user.

17. The method as defined in claim 10, wherein the notification is emailed to the user.

18. The method as defined in claim 10, further comprising causing a user-created identifier associated with the caller to be presented to the user via the notification without revealing the caller's private phone number.

19. A method of processing a call from a caller with a private number to a first user without revealing the private number to the first user, the method comprising:

receiving at a first communications system a first call from a caller and an associated private phone number, wherein the first call is intended for a first user;

storing the private phone number using encryption in computer readable memory, wherein the first user is prevented from viewing the private phone number;

initiating, via the first communications system, the transmission of a message over a data network to a computer terminal used by the first user, the message configured to provide a notification related to the call without displaying the private phone number to the first user;

enabling, via a user interface accessible via at least one terminal, the first user to return the call to the private phone number without revealing the private phone number to the first user and without the private phone number appearing on the first user's phone bill; and receiving at the first communications system a caller identifier for the caller provided by the user;

causing, at least in part, the caller identifier to be stored in computer readable memory with an association with the private caller phone number without revealing the private caller phone number to the user; and at least partly in response to a second call from the caller, providing via at least one terminal the user with a notification of the second call without revealing the private caller phone number to the user, the second call notification including the user provided caller identifier.

20. The method as defined in claim 19, wherein the call is returned using Voice over Internet Protocol.

* * * * *

UNITED STATES PATENT AND TRADEMARK OFFICE
CERTIFICATE OF CORRECTION

| | | |
|---|---|---|
| PATENT NO. | : 7,508,927 B1 | Page 1 of 1 |
| APPLICATION NO. | : 11/849919 | |
| DATED | : March 24, 2009 | |
| INVENTOR(S) | : David S. Trandal et al. | |

It is certified that error appears in the above-identified patent and that said Letters Patent is hereby corrected as shown below:

At Column 1, Line 56, After "number," insert --.--.

At Column 12, Line 11, In Claim 6, change "Processing" to --processing--.

At Column 14, Line 19 (Approx.), In Claim 19, before "user;" insert --first--.

At Column 14, Line 23 (Approx.), In Claim 19, before "user;" insert --first--.

At Column 14, Line 25 (Approx.), In Claim 19, before "user" insert --first--.

At Column 14, Line 27 (Approx.), In Claim 19, before "user," insert --first--.

Signed and Sealed this

Twenty-second Day of September, 2009

David J. Kappos
*Director of the United States Patent and Trademark Office*